United States Patent [19]

Scobie

[11] Patent Number: 4,457,490

[45] Date of Patent: Jul. 3, 1984

[54] HIGH TEMPERATURE VALVE AND SEAT THEREFOR

[75] Inventor: William B. Scobie, Houston, Tex.

[73] Assignee: Keystone International, Inc., Houston, Tex.

[21] Appl. No.: 344,501

[22] Filed: Feb. 1, 1982

[51] Int. Cl.³ .................................. F16K 25/00
[52] U.S. Cl. .................... 251/174; 251/306; 277/157
[58] Field of Search ............ 251/306, 174; 277/153, 277/157, 164, 206

[56] References Cited

U.S. PATENT DOCUMENTS

| | | | |
|---|---|---|---|
| 2,232,039 | 2/1941 | Von Brethorst | 277/157 |
| 2,631,577 | 3/1953 | Carter | 251/363 |
| 3,734,457 | 5/1973 | Roos | 251/174 |
| 4,130,285 | 12/1978 | Whitaker | 251/306 |
| 4,176,675 | 12/1979 | Liberman | 251/306 |
| 4,266,752 | 5/1981 | Johnson | 251/306 |
| 4,289,296 | 9/1981 | Krause | 251/306 |
| 4,293,116 | 10/1981 | Hinrichs | 251/306 |
| 4,306,706 | 12/1981 | Olansen et al. | 251/306 |

Primary Examiner—Martin P. Schwadron
Assistant Examiner—James R. Shay
Attorney, Agent, or Firm—Browning, Bushman, Zamecki & Anderson

[57] ABSTRACT

A valve seat for use in a fluid control valve employing a pivotable valve closure element to open and close the valve, the seat comprising an annular polymeric member provided with a seating surface which sealingly engages the valve element when the valve is in the closed position, the seat further including a multiplicity of circumferential windings of strands of material wrapped around said annular member.

19 Claims, 6 Drawing Figures

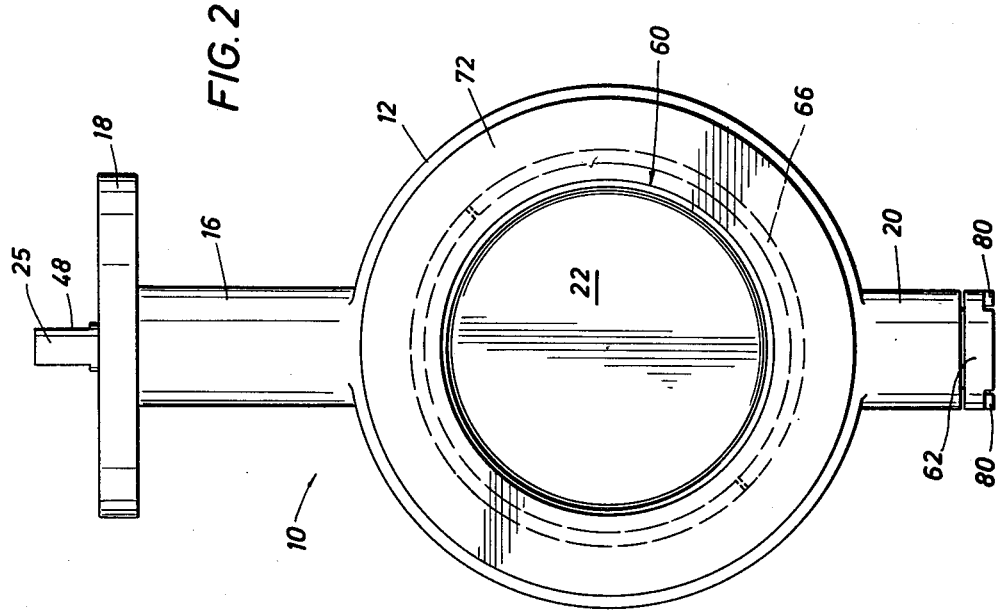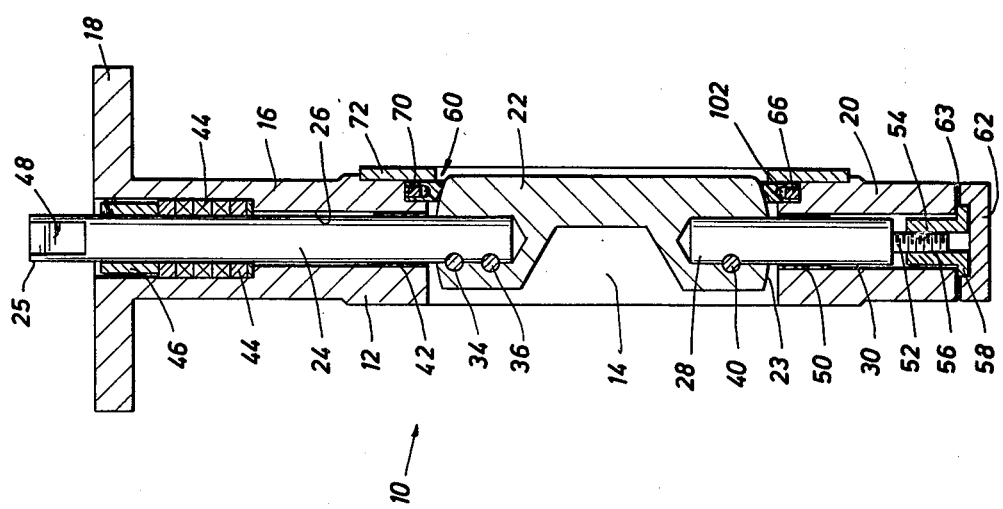

HIGH TEMPERATURE VALVE AND SEAT THEREFOR

BACKGROUND OF THE INVENTION

1. Field of the Invention

The present invention relates to fluid control valves and more particularly to an improved seat or seal for such valves, particularly valves having a pivotable valve closure element such as a butterfly or disc valve.

2. Prior Art

Valves employing pivotable closure assemblies, such as butterfly valves, have found wide use in industry for fluid handling and control. Generally, such valves, particularly butterfly valves, have been used for controlling the flow of various fluids at ambient or moderate temperatures and pressures, since the materials commonly used in the seats of such valves tend to flow or extrude at elevated temperatures allowing the valve to leak. Additionally, many such materials, e.g. certain types of rubbers, are very susceptible to chemical attack by certain fluids and thus are unacceptable for use in valves used to handle such fluids.

There are various polymeric materials which are quite inert in the sense that they are resistant to chemical attack and degradation and, in addition, can withstand elevated temperatures. Notable among such polymers are the fluorocarbon resins or polymers such as, for example, polytetrafluoroethylene, e.g. Teflon. While the fluorocarbon polymeric materials possess excellent resistance to chemical attack and can withstand elevated temperatures, they possess little or no elasticity or resiliency and tend to "cold flow" once subjected to repetitive loading. Such polymers lack "memory" and thus when compressed, repeatedly or for extended periods, fail to return to their original configuration. Indeed, valve seats made of Teflon or like materials, after being stressed sufficiently and repeatedly, will become distorted due to cold flow to the point that they will not seal effectively and, therefore, allow the valve to leak.

It is known to provide rotary or pivotable valves having seats in which a thin coating of Teflon or similar material is bonded to a rubber backing to provide a valve in which the seat is resistant to chemical attack and, to a certain extent, can withstand elevated temperatures but nonetheless will not undergo cold flow due to the resiliency of the rubber backing. It is also known to provide rotary valve seats in which a Teflon seat is biased radially inwardly by means of a spring to retard cold flow.

In seat designs using springs or elastomers e.g. rubber, to provide memory to the Teflon seat, interference between the disc and the valve seat begins long before the disc is moved to the fully closed position and continues to increase as the disc moves to that position. This disc/seat interference produces accelerated wear, particularly in the area of the disc hubs, i.e. at the diametrically opposite points of the disc where it is rotatably journaled through the seat. In such prior art valves, seating torque and hence actuator sizing becomes a factor since significant torque is encountered well before the disc moves to the fully closed position. These problems may be partially alleviated through the use of double offset disc designs which may prevent interference between the disc and seat for up to 60°-70° of the disc travel from open to closed position. However, the interference which occurs during the last 20°-30° of travel still causes localized seat wear problems.

SUMMARY OF THE INVENTION

It is therefore an object of the present invention to provide an improved seat for valve assemblies employing rotary or pivotable valve closure elements.

Another object of the present invention is to provide an improved valve assembly utilizing a seat material which is chemically inert and can withstand elevated temperatures.

Yet a further object of the present invention is to provide an improved butterfly valve and a seat therefor in which the seat is made of a polymeric material having a tendency to cold flow when subjected to repeated compressive loadings.

The above and other objects of the present invention will become apparent from the drawings, the description given herein and the appended claims.

In one embodiment, the present invention pertains to a valve seat or seal for use with a valve having a pivotable valve element which sealingly engages the valve seat, the valve seat comprising an annular polymeric member, the annular member having a generally radially inward circumferentially extending seating surface for sealingly engaging a sealing surface of a valve closure element, and a multiplicity of circumferential windings of strands of material in surrounding relationship to said annular member, said strands energizing said annular member when said valve element is in the closed position.

The strands may be formed of a suitable metal with properties of elasticity and tensile strength such that, at some point in the travel of the closure element or disc to closed position, it will tend to expand the seat and windings radially outwardly, which in turn sets up tensile stress in the windings. Such stress, in turn, generates a radially inward force resisting seat expansion and causing a tight disc to seat seal. The forces are very similar to hoop stress in a thin pressure vessel subjected to internal pressure.

An important advantage of this means of seat energization is that the windings have little or no ability to generate this resistance to radial seat displacement until almost fully aligned with the disc in closed position. Thus, the contact between the disc and seat as the former approaches its closed position does not generate the degree of interference encountered in spring or elastomer energized seats. This in turn substantially decreases seat wear and torque requirements.

The invention also contemplates a valve assembly having a pivotable valve closure element and a valve seat or seal as described above.

BRIEF DESCRIPTION OF THE DRAWINGS

The invention may be more fully understood by reference to the following description of a preferred embodiment in conjunction with the drawings wherein:

FIG. 1 is a vertical view, partially in section, of a butterfly valve constructed in accordance with the present invention;

FIG. 2 is an elevational view of the butterfly valve of FIG. 1;

DESCRIPTION OF THE PREFERRED EMBODIMENT

Figure 3:
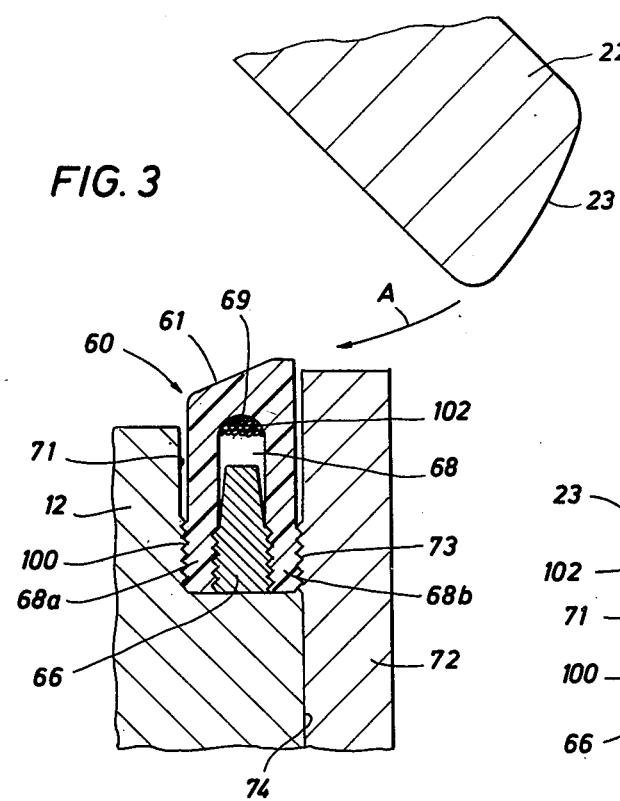
FIG. 3 is an enlarged, fragmentary section of the disc, seat and the body of the butterfly valve of FIG. 1, prior to closure.
Figure 4:
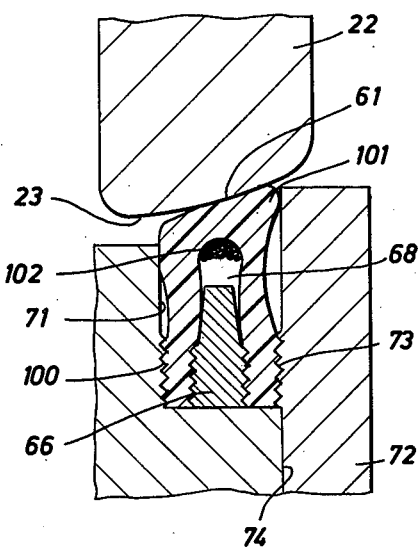
FIG. 4 is a view similar to FIG. 3 showing the valve in its fully closed position.

While the invention will be described with particular reference to a butterfly or disc valve, it is to be understood that it is not so limited. The valve seat described herein may be employed in any valve assembly having a rotatable valve closure element such as, for example, a ball valve, a plug valve, etc.

Referring first to FIG. 1, there is shown a butterfly valve 10 having a generally annular body 12 with a fluid flow passage 14 therethrough. The valve body 12 is typically adapted for positioning between opposed, pipe flanges (not shown). Extending outwardly from valve body 12 is a cylindrical neck 16 intergrally formed with body 12. A flange 18 formed on neck 16 provides a means for securing an actuator (not shown) to valve 10. Diametrically opposite neck 16 and protruding from body 12 is a boss 20.

Pivotably supported in fluid flow passage 14 is a fluid control disc 22 having a peripheral sealing surface 23, surface 23 being radiused. Disc 22 is supported by means of a first stem 24 positioned in a bore 26 of neck 16 and a second stem 28 positioned in a bore 30 of boss 20. Stem 24 is keyed to disc 22 by means of pins 34 and 36. Similarly, stem 28 is keyed to disc 22 by means of pin 40.

Stem 24 is journaled in bore 26 by means of bushing 42. Fluids are prevented from escaping from valve 10 through bore 26 by means of packing rings 44, which are held in position by means of a packing gland 46. The upper end 25 of stem 24 protrudes above circular flange 18 and is provided with opposed flats 48 to provide a means for securing a hand wheel, wrench, or other device by an actuator, for rotating disc 22 to open and close the valve 10.

Stem 28 is journalled in bore 30 by means of a bushing 50. Stem 28 also has an integral stub shaft 52 projecting from its lower end which is threaded and received in a threaded bore 54 in a locator sleeve 56. Locator sleeve 56 has a flange 58 that engages the end of boss 20 to prevent movement of locator sleeve 56 in bore 30. Locator sleeve 56 maintains disc 22 in proper position along the axis of stem 24 and stem 28. Locator sleeve 56 is held in place and bore 30 is sealed against leakage of fluids by means of a cover plate 62 that is secured via bolts 80 to boss 20 and counterbored to receive flange 58, a gasket 63 being disposed between cover plate 62 and boss 20.

Sealing between disc 22 and body 12 around the periphery of fluid flow passage 14 is provided by means of an annular seat, shown generally as 60, and described more fully below.

Seat 60 is positioned in a counterbore 70 in one face of body 12, counterbore 70 having an annular shoulder 71 (see FIGS. 3-6) provided with annularly extending serrations 100 projecting axially outwardly from shoulder 71. When seat 60 is positioned in valve 10 and valve 10 is secured between suitable pipe flanges, seat 60 is compressed against serrations 100 by an annular seat retainer plate 72 received in a counterbore 74 in a face of body 12. It can be seen that seat retainer plate 72 is likewise provided with annularly extending serrations 73.

Referring now in greater detail to FIGS. 3-6, it can be seen that seat 60 is generally U-shaped in configuration having a radially outwardly opening annular groove 68 forming annularly extending flanges 68a and 68b. Positioned in groove 68 is a seat retention ring 66 which, in practice, is of the split ring configuration (see FIG. 2) and is provided with serrations 101a and 101b on opposite, axial sides thereof. In the preferred embodiment, valve seat 60 and seat retention ring 66 are sized such that the sum of the axial widths of flanges 68a, 68b, and retention ring 66 is greater than the distance between serrations 100 on shoulder 71 and serration 73 on retainer plate 72. Accordingly, and since seat 60 is of a polymeric material, when plate 72 is received on valve body 12 and valve 10 secured between pipe flanges, serrations 100, 101b, 101a, and 73 bite into flanges 68a and 68b, providing seat retention, sealing leakage between the outer peripheral portion of seat 60 and valve body 12 and preventing "blow-out" of the seat when valve 10 is subjected to high pressure, a common problem encountered with seats made of a polymeric material.

Groove 68, at its radially intermost portion, is defined by an annularly extending, radiused surface 69. Wrapped around surface 69 are a multiplicity of windings 102, windings 102 being of a material which is sufficiently elastically extendible along its length to induce or exert hoop stress on seat member 60 when the disc 22 is in the closed position, windings 102, in effect, being circumferentially stretched when the seat 60 and the disc 22 sealingly engage one another.

Windings 102 may comprise a single strand of material wound multiple times around annular surface 69 or, alternately, may comprise a multiplicity of individual strands wound around surface 69. The windings 102 are wound around surface 69, in the preferred embodiment, such that until the disc 22 is almost fully closed, seat 60 is not energized, i.e. the radial interference forces between seat 60 and disc 22 are negligible. It will be understood, however, that if disc seat interface pressure is desired prior to complete closing or near complete closing, i.e. when disc 22 is completely sealingly engaged with seat 60, windings 102 may be wound so as to pre-stress seat 60 in what may be referred to as the relaxed condition of seat 60 i.e. when disc 22 is not sealingly engaged therewith.

Windings 102 are preferably formed from metallic materials such as strands or filaments of stainless steel or the like. However, windings 102 may also be made of other materials such as for example nylon filament or other synthetic polymeric materials, thermoplastic or thermosetting in nature, which provide the requisite qualitites of elasticity and tensile strength so as to be able to induce or exert a radially inward force on the valve seat when the valve closure element and seat are sealingly engaged and the strands thereby tensioned, i.e. when the valve is in the closed position. For example, filaments of nylon, polyester, etc. may be employed. The primary considerations in the selection of a material for forming windings 102 are that it possess the requisite properties, as described above regarding inducing radial force, and that it be able to withstand the temperatures to which the valve is subjected. Thus, for example, in the case where the valve is used in high pressure high temperature environments, windings of a metallic material are preferred. The term "strand" as used herein is intended not only to include filaments or fibers, e.g. monofilaments, but also includes braided or like configurations wherein individual filaments of fibers or used to form a strand, the strand not being a monofilament but being formed of multiple filaments. An example of a suitable multi-filament strand for use in forming the windings 102 is a material known as ACCULON #AN 27 manufactured by Cable Strand Corporation, Long Beach, Calif. ACCULON #AN 27 consists of seven strands of 5 mil diameter, 302 Stainless Steel braided and encased in a nylon coating. In a typical example, a butterfly valve having a seat as described above and wrapped with ten turns of ACCULON #AN 27 seat showed excellent high temperature, high pressure properties.

The present invention is particularly directed to valve seats which are made of polymeric materials, either natural or synthetic, which possess little or no elasticity and tend to "cold flow" when subjected to repetitive loading. Such materials lack "memory" in that when subjected to repetitive or extended loading, they will not return to the configurations they possessed prior to such loading. Typical of such polymeric materials are fluorocarbon resins such as polytetrafluoroethylene, commonly referred to as Teflon. Fluorocarbon resins are ideally suited as polymeric materials for the seat of the present invention because of their chemical inertness and high temperature stability. The polymeric material from which the annular seat member is constructed may contain additives or fillers, e.g. reinforcing materials, may be a blend of one or more polymeric material and, in general, can be tailored to fit the service conditions to which the valve is subjected.

It may also be desirable to provide means for preventing the strands 102 from cutting into the seat, particularly where the strands are metallic. To this end, such metal strands may be encased or wrapped in a wear-resistant material such as nylon. Alternatively, a free floating shield or barrier may be interposed between surface 69 and windings 102. Such a barrier should be of wear-resistant material, but such as not to interfere with the necessary movements of windings 102 and seat 60.

Referring to FIG. 3, which shows the valve in the open position and seat 60 in the relaxed position, it can be seen that the seat is provided with an annular bevelled seating surface 61. As the seat is moved in the direction of arrow A, i.e. toward the closed position (see FIG. 4) and assuming no fluid flow or pressure acting on disc 22, sealing surface 23 of disc 22 and bevelled seating surface 61 of seat 60 will be engaged and seat 60 will be distended or bulged, as at 101, i.e. it will axially expand between body 12 and plate 72. In the condition shown in FIG. 4, i.e. in the conditions of no flow/no pressure and hence no disc deflections, seat 60 is forced radially outwardly, the radially outward expansion resulting in a disc/seat pressure generated by windings 102 which are circumferentially stretched inducing a force acting radially inwardly so as to force bevelled surface 61 of seat 60 into sealing engagement with sealing surface 23 of disc 22.

Figure 5:
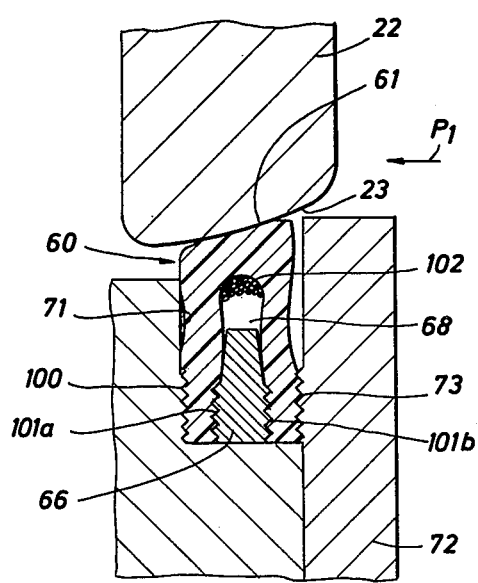
FIG. 5 is a view similar to FIG. 4 showing the effect of pressure on one side of the valve.

Referring now to FIG. 5, and assuming flow through the valve in the direction shown by arrow $P_1$, the pressure exerted on disc 22 resulting in deflection thereof will be compensated for by seat 60 moving axially downstream, i.e. in the direction of arrow $P_1$. However, the radially inward force induced by windings 102 will continue to maintain the integrity of seat 60 and disc/seat interface pressure sufficient to cause a seal even when the pressure is relatively high.

Figure 6:
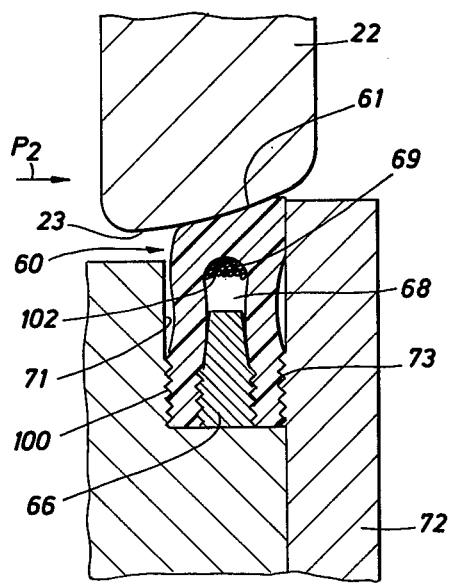
FIG. 6 is a view similar to FIG. 5 showing the effect of pressure on the other side of the valve.

FIG. 6 shows the relative configuration of disc 22 and seat 60 with pressure exerting a force in the direction of arrow $P_2$, i.e. opposite to the direction of flow shown in FIG. 5. As seen, any disc deflection is compensated for by axial movement of seat 60 toward seat retention plate 72. Disc/seat interface pressure is still maintained because of the radial force induced by windings 102 forcing bevelled surface 61 of seat 60 and sealing surface 23 of disc 22 into sealing, interference engagement with one another.

While particular embodiments of the present invention have been shown and modified, it will be apparent to those skilled in the art that minor changes and modifications may be made therein without departing from the true scope and spirit of the invention.

I claim:

1. A valve seat for use in a fluid control valve having a pivotable valve closure element to open and close said valve comprising:
   an annular, polymeric member having a seating surface for sealingly engaging said valve element when said valve is in the closed position; and
   a multiplicity of circumferential windings of material in surrounding relationship to said annular member, each of said windings comprising an elongate strand of said material, each of said strands having its centerline oriented substantially circumferentially with respect to said sealing section for generally the full length of said windings, the ends of said windings being fixed with respect to one another, said windings being placed in tensile stress due to circumferential stretching when said valve is in the closed position.

2. The seat of claim 1 wherein said windings are formed from a single strand of said material.

3. The seat of claim 1 wherein said windings are formed from a plurality of individual strands of said material.

4. The seat of claim 1 wherein said annular member is provided with a generally radially outwardly opening annular groove for receiving said windings.

5. The seat of claim 4 further including annular retention means positioned in said annular groove.

6. The seat of claim 5 wherein said annular retention means comprises a split-ring.

7. The seat of claim 5 wherein said annular retention means is provided with gripping means to grip said annular member.

8. The seat of claim 1 wherein said polymeric member is comprised of a fluorocarbon resin.

9. The seal of claim 1 wherein said windings are comprised of a metallic material.

10. A valve assembly comprising:
    a valve body having a flow passage therethrough;
    a valve closure element pivotable within said body between open and closed positions to control the flow of fluid through said flow passage, said valve closure element having a sealing surface;
    an annular, polymeric seat member having a seating surface positioned in said body, said sealing surface on said valve closure element and said seating surface being sealingly engaged when said valve is in said closed position; and
    a multiplicity of circumferential windings of material in surrounding relationship to said annular seat member, each of said windings comprising an elongate strand of said material, each of said strands having its centerline oriented substantially circumferentially with respect to said sealing section for generally the full length of said winding, the ends of said windings being fixed with respect to one another, said windings being placed in tensile stress due to circumferential stretching when said valve is in the closed position.

11. The assembly of claim 10 wherein said windings are formed from a single strand of said material.

12. The assembly of claim 10 when said windings are formed from a plurality of individual strands of said material.

13. Assembly of claim 10 wherein said seat member is provided with a generally radially outwardly opening annular groove for receiving said windings.

14. The assembly of claim 13 further including annular retention means positioned in said annular groove.

15. The assembly of claim 14 wherein said annular retention means comprises a split-ring.

16. The assembly of claim 14 wherein said annular retention means is provided with gripping means to grip said seat member.

17. The assembly of claim 10 wherein said polymeric member is comprised of a fluorocarbon resin.

18. The assembly of claim 10 wherein said windings are comprised of a metallic material.

19. The assembly of claim 10 wherein said valve assembly comprises a butterfly valve.

* * * * *

REEXAMINATION CERTIFICATE (617th)
United States Patent
[11] B1 4,457,490

Scobie

[45] Certificate Issued Jan. 6, 1987

[54] HIGH TEMPERATURE VALVE AND SEAT THEREFOR

[75] Inventor: William B. Scobie, Houston, Tex.

[73] Assignee: Keystone International, Inc., Houston, Tex.

Reexamination Request:
No. 90/000,948, Feb. 4, 1986

Reexamination Certificate for:
Patent No.: 4,457,490
Issued: Jul. 3, 1984
Appl. No.: 344,501
Filed: Feb. 1, 1982

[51] Int. Cl.⁴ ............................................. F16K 25/00
[52] U.S. Cl. .................................. 251/174; 251/317; 251/306; 277/157
[58] Field of Search ....................... 251/170, 174, 306

[56] References Cited

U.S. PATENT DOCUMENTS

| | | | |
|---|---|---|---|
| 2,631,577 | 3/1953 | Carter | 251/363 X |
| 3,552,407 | 1/1971 | Hirano | 251/306 |
| 3,642,248 | 2/1972 | Benware | 251/172 |
| 4,306,706 | 12/1981 | Olansen | 251/306 |

FOREIGN PATENT DOCUMENTS

| | | | |
|---|---|---|---|
| 950885 | 7/1974 | Canada . | |
| 2235988 | 1/1974 | Fed. Rep. of Germany | 251/170 |

*Primary Examiner*—Harold Weakley

[57] ABSTRACT

A valve seat for use in a fluid control valve employing a pivotable valve closure element to open and close the valve, the seat comprising an annular polymeric member provided with a seating surface which sealingly engages the valve element when the valve is in the closed position, the seat further including a multiplicity of circumferential windings of strands of material wrapped around said annular member.

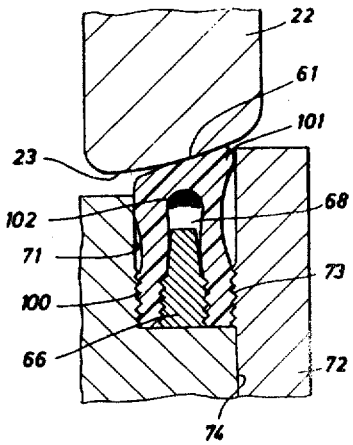

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 11 and 12 are cancelled.

Claims 1 and 10 are determined to be patentable as amended.

Claims 4–9 and 13–19, dependent on an amended claim, are determined to be patentable.

1. A valve seat for use in a fluid control valve having a pivotable valve closure element to open and close said valve comprising:
   an annular, polymeric member having a seating surface for sealingly engaging said valve element when said valve is in the closed position; and
   a [multiplicity of circumferential] *single, elongate strand of material forming an annular bundle of about ten or more* windings of *said* material in surrounding relationship to said annular member, [each of said windings comprising an elongate strand of said material,] *the radially inner surface of said bundle of said windings being in direct contact with said annular member,* each of said [strands] *windings in said bundle* having its centerline oriented substantially circumferentially with respect to said [sealing section] *seating surface* for generally the full length of said [windings] *winding*, the ends of said [windings] *strand* being fixed with respect to one another, said windings being placed in tensile stress due to circumferential stretching when said valve is in the closed position.

10. A valve assembly comprising:
   a valve body having a flow passage therethrough;
   a valve closure element pivotable within said body between open and closed positions to control the flow of fluid through said flow passage, said valve closure element having a sealing surface;
   an annular, polymeric seat member having a seating surface positioned in said body, said sealing surface on said valve closure element and said seating surface being sealingly engaged when said valve is in said closed position; and
   a [multiplicity of circumferential] *single, elongate strand of material forming an annular bundle of about ten or more* windings of *said* material in surrounding relationship to said annular [seat] member, [each of said windings comprising an elongate strand of said material,] *the radially inner surface of said bundle of said windings being in contact with said annular member,* each of said [strands] *windings in said bundle* having its centerline oriented substantially circumferentially with respect to said [sealing section] *seating surface* for generally the full length of said winding, the ends of said [windings] *strand* being fixed with respect to one another, said windings being placed in tensile stress due to circumferential stretching when said valve is in the closed position.

* * * * *